US012110864B1

(12) United States Patent
Akhter et al.

(10) Patent No.: US 12,110,864 B1
(45) Date of Patent: Oct. 8, 2024

(54) AEROFOIL MODULE FOR PROPELLER AND TURBINE BLADES WITH PASSIVE VARIABLE AIR PASSAGE COVER

(71) Applicant: UNITED ARAB EMIRATES UNIVERSITY, Al-Ain (AE)

(72) Inventors: Md. Zishan Akhter, Al-Ain (AE); Farag Khalifa Omar, Al-Ain (AE)

(73) Assignee: UNITED ARAB EMIRATES UNIVERSITY (AE)

( * ) Notice: Subject to any disclaimer, the term of this patent is extended or adjusted under 35 U.S.C. 154(b) by 0 days.

(21) Appl. No.: 18/297,630

(22) Filed: Apr. 9, 2023

(51) Int. Cl.
*F03D 7/02* (2006.01)
*F03D 1/06* (2006.01)

(52) U.S. Cl.
CPC ......... *F03D 7/0236* (2013.01); *F03D 1/0641* (2013.01); *F05B 2240/202* (2013.01); *F05B 2240/2211* (2013.01)

(58) Field of Classification Search
CPC .... F03D 7/0236; F03D 1/0641; F03D 1/0675; F05B 2240/202; F05B 2240/2211; F05B 2240/313; F05B 2240/31; Y02E 10/72
See application file for complete search history.

(56) References Cited

U.S. PATENT DOCUMENTS 1,501,248 A * 7/1924 William .................. B64C 11/16
244/65
1,902,133 A * 3/1933 Lavelle ................... B64C 9/323
236/44 A
6,142,425 A 11/2000 Armanios et al.
6,984,110 B2 * 1/2006 Jang ...................... F03D 1/0633
416/88

(Continued)

FOREIGN PATENT DOCUMENTS

CN 206845401 U 1/2018
CN 113700596 A 11/2021
DE 4201457 C1 4/1993

OTHER PUBLICATIONS

Zao Ni, Manhar Dhanak, Tsung-chow Su, Improved performance of a slotted blade using a novel slot design (abstract), Journal of Wind Engineering and Industrial Aerodynamics, vol. 189, 2019, pp. 34-44, ISSN 0167-6105, https://doi.org/10.1016/j.jweia.2019.03.018.

*Primary Examiner* — J. Todd Newton
(74) *Attorney, Agent, or Firm* — Winthrop & Weinstine, P.A.

(57) ABSTRACT

An aerofoil module for use in a blade of a propeller or turbine comprising: a body comprising a suction surface and a pressure surface; an air passage traversing the body, the air passage having an entrance opening on the pressure surface and an exit opening on the suction surface; a cover for covering a variable portion of a cross-section of the air passage; and a mechanism for varying the portion of the cross-section of the air passage covered by the cover, wherein the mechanism reacts passively to the oncoming air speed of oncoming air in the axial direction of the propeller/turbine; wherein the mechanism varies the portion of the cross-section covered by the cover such that the cover covers a smaller portion of the cross-section in response to a higher oncoming air speed, and covers a larger portion of the cross-section in response to a lower oncoming air speed.

16 Claims, 6 Drawing Sheets

(56) References Cited

U.S. PATENT DOCUMENTS

| | | | | |
|---|---|---|---|---|
| 7,435,057 | B2* | 10/2008 | Parera | F03D 1/0633 |
| | | | | 415/81 |
| 8,016,560 | B2* | 9/2011 | McGrath | F03D 1/0675 |
| | | | | 416/41 |
| 8,128,364 | B2* | 3/2012 | Pesetsky | F03D 1/0675 |
| | | | | 415/4.3 |
| 8,246,311 | B2* | 8/2012 | Pesetsky | F03D 1/06 |
| | | | | 416/90 R |
| 11,415,100 | B2* | 8/2022 | Altmikus | F03D 1/0641 |
| 2010/0266382 | A1 | 10/2010 | Campe et al. | |
| 2011/0103952 | A1* | 5/2011 | Pesetsky | F03D 1/06 |
| | | | | 416/1 |
| 2011/0103953 | A1 | 5/2011 | Haans et al. | |
| 2011/0142629 | A1* | 6/2011 | Pesetsky | F03D 1/0675 |
| | | | | 416/23 |
| 2011/0142638 | A1* | 6/2011 | McGrath | F03D 1/0633 |
| | | | | 416/91 |
| 2011/0229329 | A1 | 9/2011 | Occhipinti | |

* cited by examiner

AEROFOIL MODULE FOR PROPELLER AND TURBINE BLADES WITH PASSIVE VARIABLE AIR PASSAGE COVER

TECHNICAL FIELD

The present invention is related to the technical field of propellers and turbines blades, particularly wind turbines and aircraft propellers and rotors.

BACKGROUND

Aerofoils are generally operable with a range of angles of attack. Typically, if it is desired to increase the amount of lift, the angle of attack can be increased. However, for a given air speed, beyond a certain angle of attack, the aerofoil may begin to stall. More precisely, stall occurs when the air flow on the suction side separates from the suction surface of the aerofoil. As is well-understood, the phenomenon of flow separation is due to the reduction of total pressure (i.e. energy) in the air flow on the suction surface as it flows from the leading edge to the trailing edge. In general, as the angle of attack increases, the point at which flow separation occurs shifts towards the leading edge. Therefore, if the angle of attack is increased excessively, flow separation on the suction surface may be so severe that a sudden drop in the amount of lift generated can be observed. In other words, the aerofoil stalls.

In order to enable the aerofoil to operate at a higher angle of attack, and thus generate more lift, it is known to employ a technique known as "boundary layer blowing". In brief, this is achieved by injecting a high-energy air flow on the suction surface at a position upstream to the point of flow separation. This results in a re-energisation of the boundary layer on the suction surface, which enables the air flow on the suction surface to remain adhered for longer, thereby delaying the onset of flow separation and delaying the onset of aerodynamic stall. This in turn enables the aerofoil to be operated at a higher angle of attack, and more lift can be generated. In the case of a turbine, this means more energy can be extracted from the fluid (e.g. air) flow. In the case of a propeller, this means more thrust can be generated.

To this end, it has been known to implement boundary layer blowing by integrating multiple spanwise slots distributed uniformly on the aerofoil, each slot being equipped with a dedicated control valve for both steady and unsteady/pulsed actuation. In spite of significant achievements, the practical application of such blow-type flow control has proved to be a challenging task. In particular, flow actuation requires a complex actuation system comprising flow generation components, housing, flow distribution components, and control valves. Incorporating these components in an existing propeller or turbine blade design requires major redesigning and optimisation to reduce complexity, weight and cost, while sufficient structural strength and integrity must be maintained. A further limitation of the blow-type flow control is the actuation power expense associated with its operation. This is because the blowing mechanism requires compressed air to operate, which in itself requires a high power draw from the system, which can significantly offset the gains resulting from improvements in aerodynamic performance. As such, the balance between cost and benefit of this type of flow control can be unfavourable for widespread deployment and commercialisation.

Furthermore, from an aerodynamic point of view, the carving of slots in the aerofoil introduces deviations from an ideal aerodynamic profile and leads to drag augmentation. This effect is particularly prominent during operations at high angles of attack.

It is thus an object of the invention to simplify a system of blow-type flow control.

It is another object of the invention to reduce the power penalty of a system of blow-type flow control.

It is another object of the invention to reduce the amount of drag introduced by a system of blow-type flow control.

SUMMARY

According to an embodiment of the present invention, there is disclosed an aerofoil module for use in a blade of a propeller or turbine, the aerofoil module comprising: a body comprising a suction surface and a pressure surface; an air passage traversing the body, wherein the air passage has an entrance opening on the pressure surface and an exit opening on the suction surface; a cover configured to cover a variable portion of the cross-section of the air passage; and a mechanism configured to vary the portion of the cross-section of the air passage covered by the cover, wherein the mechanism is configured to react passively to the oncoming air speed of oncoming air in the axial direction of the propeller or turbine; wherein the mechanism is configured to vary the portion of the cross-section of the air passage covered by the cover such that the cover covers a smaller portion of the cross-section of the air passage in response to a higher oncoming air speed, and covers a larger portion of the cross-section of the air passage in response to a lower oncoming air speed.

The mechanism may be configured to react passively to the centrifugal force induced by the rotation of the propeller or turbine, such that the cover covers a smaller portion of the cross-section of the air passage in response to a higher rotational speed of the propeller or turbine, and to cover a larger portion of the cross-section of the air passage in response to a lower rotational speed of the propeller or turbine.

The air passage may comprise an elongate slot arranged substantially in the spanwise direction of the aerofoil module.

The cover may have a variable spanwise extent and is configured to cover a variable spanwise length of the air passage.

The mechanism may comprise a sliding mass configured to slide in a spanwise direction of the aerofoil module, wherein the cover has a tip-side end and a root-side end, the root-side end is connected to the sliding mass, and the spanwise extent of the cover is variable by the sliding mass moving the root-side end of the cover.

The aerofoil module may further comprise a biasing member biasing the sliding mass towards the root of the blade.

The aerofoil module may further comprise a damper configured to dampen the motion of the sliding mass.

The cover may comprise a pliable membrane.

The aerofoil module may further comprise a spool, wherein the spanwise extent of the cover is variable by winding a variable length of the cover onto the spool.

The spool may be biased to maintain the cover under tension.

The aerofoil module may further comprise a sliding mass configured to slide in a spanwise direction of the aerofoil module. The cover may have a tip-side end and a root-side end. The spool may be rotatably fixed to the sliding mass.

The cover may be configured to cover a variable portion of one of the entrance opening and the exit opening.

The aerofoil module may comprise first and second said covers. The first cover may be configured to cover a variable portion of the entrance opening. The second cover may be configured to cover a variable portion of the exit opening.

The aerofoil module may further comprise retractable walls defining a portion of the air passage which is not covered by the cover.

The aerofoil module may further comprise a sliding mass configured to slide in a spanwise direction of the aerofoil module. The retractable walls may have a root-side end and a tip-side end, and the tip-side end of each of the retractable walls may be attached to sliding mass.

The mechanism may be configured to react passively to a thrust from the oncoming air acting on the pressure surface, such that the cover covers a smaller portion of the cross-section of the air passage in response to a higher thrust, and covers a larger portion of the cross-section of the air passage in response to a lower thrust.

The cover may be configured to cover a variable portion of the entrance opening.

The cover may be rotatable between a closed position in which the cover blocks air from entering the air passage, and an open position in which the cover allows air to enter the air passage.

The aerofoil module may further comprise a biasing member biasing the cover towards the closed position.

The aerofoil module may further comprise a second cover configured to cover a variable portion of the exit opening.

The second cover may be mechanically linked to and actuated by the first cover, such that the second cover covers a larger portion of the exit opening when the first cover covers a larger portion of the entrance opening, and the second cover covers a smaller portion of the exit opening when the first cover covers a smaller portion of the entrance opening.

In accordance with an embodiment of the present invention, there is disclosed a propeller or turbine blade comprising: a body comprising a suction surface and a pressure surface; an air passage traversing the body, wherein the air passage has an entrance opening on the pressure surface and an exit opening on the suction surface; a cover configured to cover a variable portion of the cross-section of the air passage; and a mechanism configured to vary the portion of the cross-section of the air passage covered by the cover, wherein the mechanism is configured to react passively to the oncoming air speed of oncoming air in the axial direction of the propeller or turbine; wherein the mechanism is configured to vary the portion of the cross-section of the air passage covered by the cover such that the cover covers a smaller portion of the cross-section of the air passage in response to a higher oncoming air speed, and covers a larger portion of the cross-section of the air passage in response to a lower oncoming air speed.

In accordance with an embodiment of the present invention, there is disclosed a propeller or turbine comprising a plurality of blades, each of the blades comprising: a body comprising a suction surface and a pressure surface; an air passage traversing the body, wherein the air passage has an entrance opening on the pressure surface and an exit opening on the suction surface; a cover configured to cover a variable portion of the cross-section of the air passage; and a mechanism configured to vary the portion of the cross-section of the air passage covered by the cover, wherein the mechanism is configured to react passively to the oncoming air speed of oncoming air in the axial direction of the propeller or turbine; wherein the mechanism is configured to vary the portion of the cross-section of the air passage covered by the cover such that the cover covers a smaller portion of the cross-section of the air passage in response to a higher oncoming air speed, and covers a larger portion of the cross-section of the air passage in response to a lower oncoming air speed.

LIST OF FIGURES

DETAILED DESCRIPTION

The present invention is directed to an aerofoil module for use in a blade of a propeller or turbine and to blades, propellers and turbines including such modules. As used herein, the term "propeller" refers to any rotary device with blades which converts mechanical energy into aerodynamic thrust, and the term "turbine" refers to any rotary device with blades which converts energy from an air flow into mechanical work. In both propellers and turbines, blades function by generating lift. The term "lift" is to be understood in the aerodynamic sense, i.e. it is the component of the force resulting from air flow around the aerofoil perpendicular to the oncoming flow direction in a frame of reference fixed to the aerofoil. As the present invention relates to lift generation in general, it has wide applicability in many kinds of propellers and turbines, such as wind turbines, aircraft propellers and rotors.

The aerofoil module may be capable of achieving passive boundary-layer blowing, which may delay or prevent flow transition/separation and boost aerodynamic performance. Boundary-layer blowing may extend the operation envelope of the aerofoil by effectively enhancing the flow-control at higher windspeed and/or rotational speed. When employed on a wind turbine, the maximum amount of power that can be generated may increase. When employed on an aircraft propeller, or a helicopter rotor, for example, the maximum amount of thrust that can be generated may increase. The aerofoil module may also provide improvements in terms of noise attenuation and/or flutter/vibration suppression. Further, the aerofoil module may enable a simple design, and may reduce the power penalty suffered by devices employing conventional blowing techniques.

Figure 1:
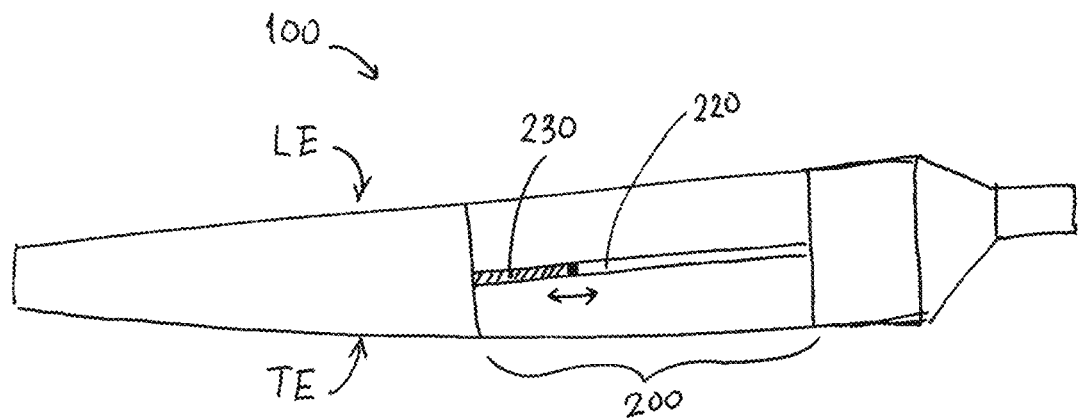
FIG. 1 shows a wind turbine blade in accordance with an embodiment of the invention.

As shown in FIG. 1, the aerofoil module 200 is provided in a blade 100. The blade 100 may be a wind turbine blade such as depicted in FIG. 1. However, as noted above, the blade 100 may be a blade of another kind of propeller or turbine.

Figure 2:
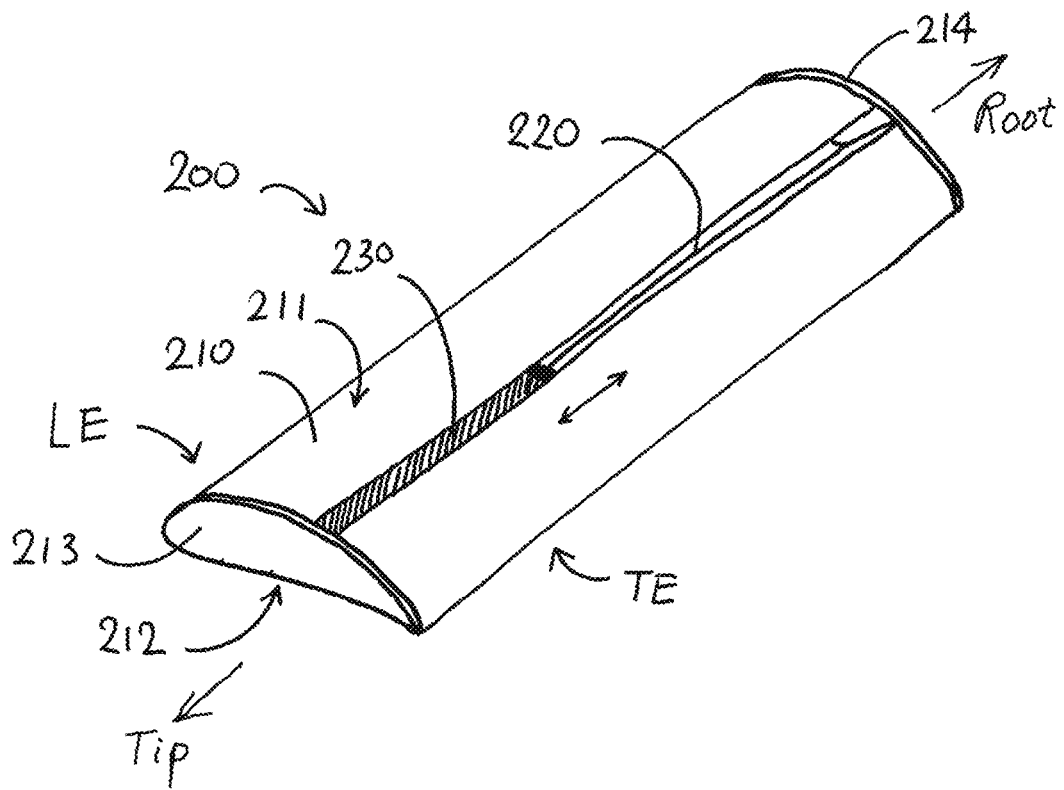
FIG. 2 shows an aerofoil module in accordance with an embodiment of the invention.
Figure 3:
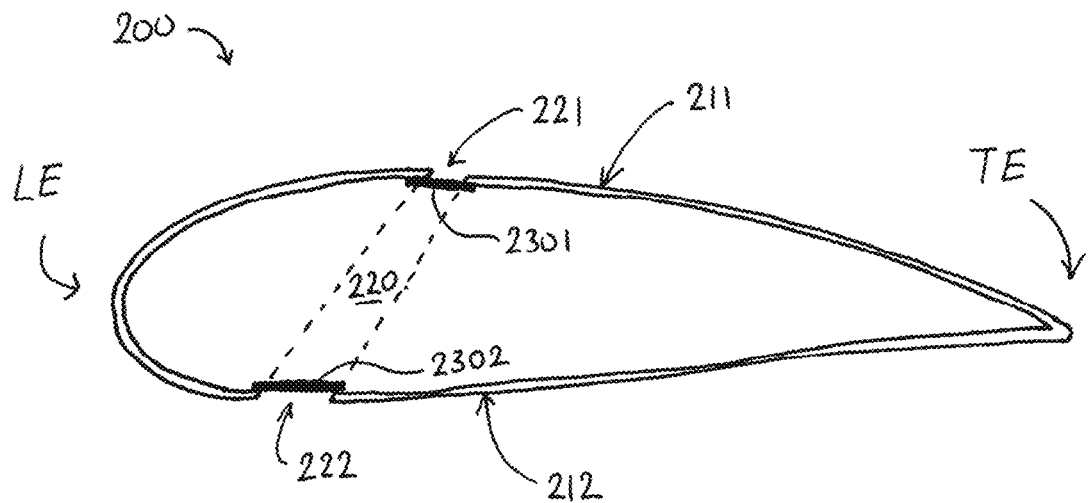
FIG. 3 shows a cross-section of the aerofoil module of FIG. 2.

As shown in FIG. 2, the aerofoil module 200 comprises a body 210. With reference to FIG. 1, the body 210 may form a section of the blade 100. The body 210 comprises a suction surface 211 and the pressure surface 212. As known in the art, as the oncoming airflow flows around an aerofoil, a suction force is generated on the suction surface, and a pressure force is generated on the pressure surface, and lift is generated as a result of the pressure difference between the suction surface and the pressure surface. As shown in FIG. 2, the aerofoil module 200 comprises an air passage 220 traversing the body 210. As best seen in FIG. 3, the air passage 220 has an entrance opening 222 on the pressure surface 212, and an exit opening 221 on the suction surface 211. Referring to FIG. 2 again, the aerofoil module 200 further comprises a cover 230 configured to cover a variable portion of the cross-section of the air passage 220. Therefore, air on the pressure surface 212 may flow into the entrance opening 222 and through the non-covered portion of the air passage 220, out of the exit opening 221 and on to the suction surface 211. Therefore, high-energy air flow on the pressure surface 212 may be directed to the suction surface 211 in order to achieve boundary layer blowing in a passive manner. That is, this approach to boundary layer blowing does not require an external energy source, e.g. an air compressor or another external source of compressed air.

The basic principle of passive boundary layer blowing is demonstrated using a modified version of the National Renewable Energy Laboratory (NREL) Phase-VI research wind turbine blade, which has a blade size of 5.03 m. The chord varies in size from 737 mm (root) to 300 mm (tip).

Figure 9:
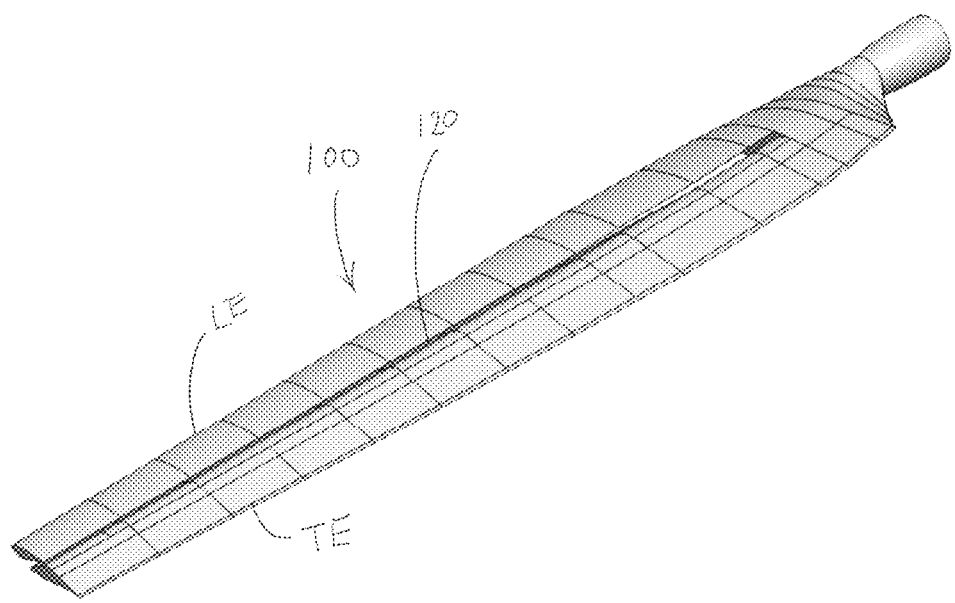
FIG. 9 shows a wind turbine blade with passive boundary-layer blowing.

As shown in FIG. 9, the NREL VI blade is modified to include a slot 120. The size of the slot is normalized in terms of the chord length c, and subjected to parametric study for the optimal dimension. The chordwise positioning and orientation of the slot are determined to provide optimal aerodynamic performance by the virtue of blowing flow-control technique.

The slot 120 extends spanwise along the blade through 30% to 100% of the span of the blade, measured from the blade root. The entrance opening is provided on the pressure surface at 0.2c measured from the leading edge LE, and the exit opening is provided on the suction surface at 0.5c measured from the leading edge LE. This arrangement is found to provide effective passive boundary layer blowing for aerodynamic performance enhancements through flow-separation suppression, and improved airflow control around the blade.

Figure 10A:
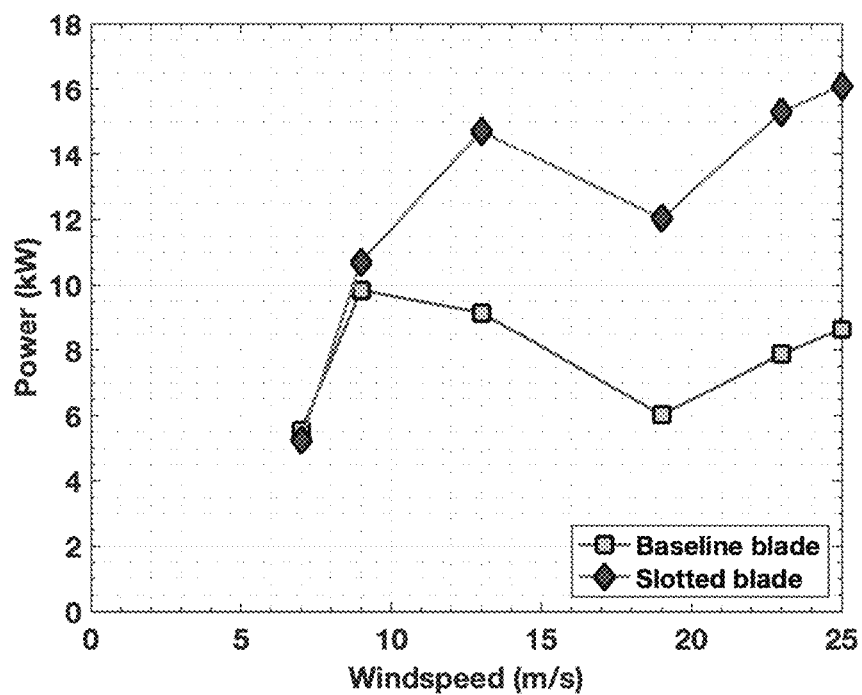
FIGS. 10a to 10c are graphs demonstrating the aerodynamic effects of passive boundary-layer blowing.

The torque and power of the modified blade 100 was investigated. An analysis of simulated blades commences with the computation of torque and power generated over a tested windspeed range, $V_W$=7 to 25 m/s. FIG. 10a shows the improvement of slotted design over a baseline NREL VI blade (i.e. without the slot), particularly under moderate-high wind conditions. The slotted blade 100 exhibits torque augmentations of up to 988.3 N·m, recorded at the windspeed of 25 m/s. It exhibits maximum relative torque enhancement of 99.9% attained at the windspeed of 19 m/s. The improved ability of the slotted blade 100 to harvest energy compared to the baseline is evident in the plot. As shown, the maximum power augmentation by the slotted blade is recorded as 7.45 kW at the windspeed of 25 m/s. Likewise, relative power augmentations of up to 99.9% is demonstrated at 19 m/s windspeed.

At 7 m/s windspeed, the slotted blade 100 generates a comparatively lower torque than the baseline model at this low windspeed condition. It leads to a lower power production and poor performance, as can be seen in FIG. 10a. The diminution in torque and subsequent power is recorded as 39.4 N·m, and 0.3 kW, respectively, which translate to a small decrease of 5.37%. The reduction in torque is believed to be caused by the increase in the overall form-drag induced by slot flow. Thus, as found by the inventors, the inclusion of the slot 120 can be detrimental to power production at lower windspeeds.

Figure 10B:
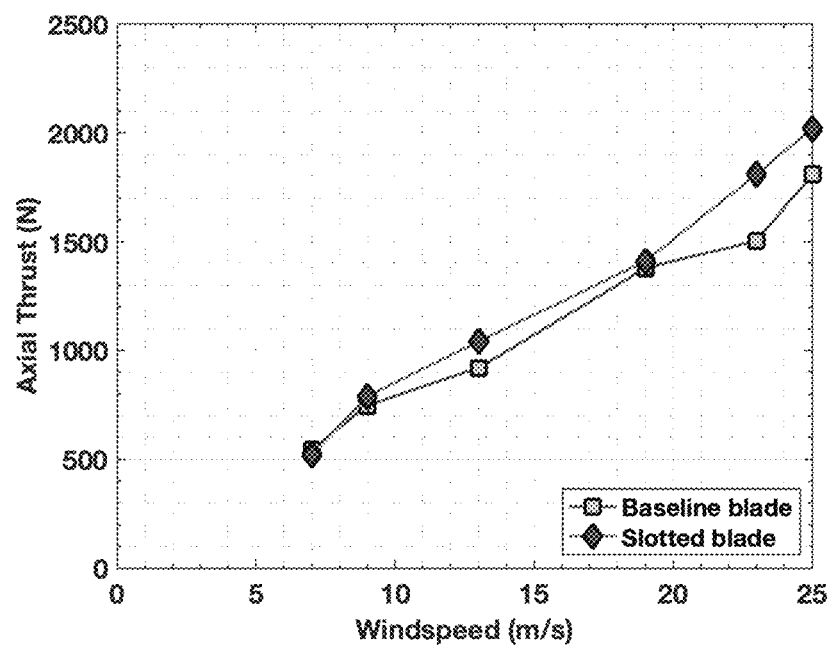
Figure 10C:
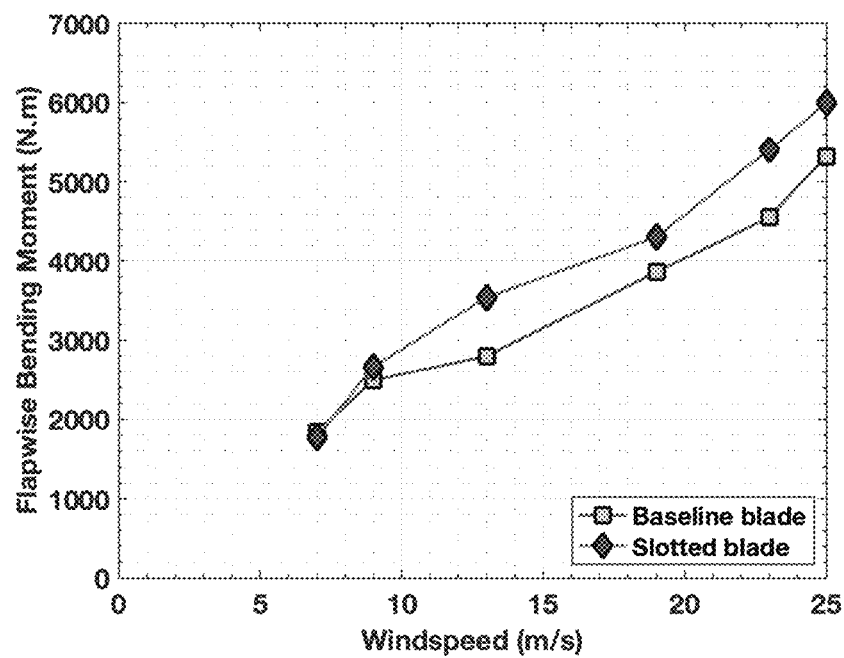

The axial thrust and bending moment of the slotted blade 100 was also investigated. Wind axially exerts a thrust force on the wind turbine blades during operation. It yields concentrated stresses at the blade root which is computed as a "flapwise bending moment". These parameters are indicative of kinetic energy extraction from the wind, before being lost as turbulent wake. The axial thrust force and flapwise bending moment are evaluated for windspeeds, $V_W$=7 to 25 m/s. The results of the analysis are summarised in FIGS. 10b and 10c.

As shown, an increase in the windspeed globally magnifies the axial force and bending moment owing to amplified wind kinetic energy. At a windspeed of 7 m/s, laminar flow is prevalent over the blade surface. Introduction of slot 120 in the blade profile provides a leakage root for the loss of wind. This marginally diminishes the axial thrust and subsequent bending moment on the slotted blade. In contrast, at higher windspeeds of $V_W$≥9 m/s, the slotted blade 100 experiences greater axial thrust and subsequent flapwise bending moment due to improved flow control provided by the slot 120, this being marked by flow transition. The slot-jet momentum extensively suppresses unsteady flow across the blade suction surface. This induces local aerodynamic enhancement which in turn augments wind energy extraction, thereby generating amplified thrust and bending moment on the blade. The axial thrust, and flapwise bending moment are maximized by up to 20.4% and 26.5%, respectively.

As can be seen, the flow control enhancement provided by the slot 120 is significant at windspeeds $V_W$≥9 m/s. However, at lower windspeeds, as found by the present inventors, the presence of the slot 120 may deteriorate the performance due to increased form-drag and flow leakage.

Thus, in view of the performance deterioration at low oncoming air speeds, the present invention seeks to provide a variable air passage 220, which may help achieve good blade aerodynamic performance despite changing air speed conditions.

Therefore, as shown in FIGS. 1 to 3, the aerofoil module further comprises a cover 230, 2301, 2302 configured to cover a variable portion of the cross-section of the air passage 220. The cover 230 may be variously implemented. For example, as shown in FIG. 3, a cover 2302 may be positioned to cover the entrance opening 222. Alternatively, a cover 2301 may be positioned to cover the exit opening 221. Alternatively, separate covers 2301, 2302 may be positioned to cover both the exit and entrance openings 221, 222.

A mechanism is provided to vary the portion of the cross-section of the air passage 220 covered by the cover 230, 2301, 2302. The mechanism is configured to react passively to the oncoming air speed of oncoming air in the axial direction of the propeller or turbine 10. The term "passively" is used herein to indicate that the mechanism does not require an external source of energy in order to function. For example, the mechanism may be passive in the sense that it does not require a supply of electricity or pneumatic actuation in order to function. The passive mechanism may be purely mechanical. Because the mechanism is passive, it may not incur a power penalty, such as seen as in known blow-type flow-control using active actuation.

As noted above, in a blade 100 with a fixed slot 120 such as shown in FIG. 9, a performance deterioration may be observed at low air speeds. Therefore, in the aerofoil module 200 in accordance with an embodiment of the present invention, the mechanism may be configured to vary the extent of the covered portion of the air passage 220 according to an inverse relationship with the oncoming air speed. That is, the mechanism may be configured to vary the portion of the cross-section of the air passage 220 covered by the cover 230, 2301, 2302 such that the cover 230, 2301, 2302 covers a smaller portion of the cross-section of the air passage 220 in response to a higher oncoming air speed, and covers a larger portion of the cross-section of the air passage 220 in response to a lower oncoming air speed. Therefore, when the oncoming air speed is low, a large portion or the entirety of the cross-section of the air passage 220 is covered, which may recover some or all of the performance losses associated with a fixed slot 120 due to increased form-drag and flow leakage. On the other hand, by covering less of the air passage 210 at higher oncoming air speeds, the aerofoil module 200 may be capable of increasing the amount of lift (and hence torque and power at the propeller or turbine 10 shaft) from the air flow compared with an aerofoil without any boundary layer blowing.

In one embodiment, the mechanism of the aerofoil module 200 may be configured to react passively to the centrifugal force induced by the rotation of the propeller or turbine 10. In particular, the mechanism may react to the centrifugal force such that the cover 230, 2301, 2302 covers a smaller portion of the cross-section of the air passage 220 in response to a higher rotational speed of the propeller or turbine 10, and to cover a larger portion of the cross-section of the air passage 220 in response to a lower rotational speed of the propeller or turbine 10. In other words, the mechanism may react to the centrifugal force such that the non-covered portion of the air passage 220 increases with the amount of centrifugal force, which in turn increases with the rotational speed of the propeller or turbine 10. In particular, the mechanism may be configured such that a maximum portion or the entirety of the air passage 220 is covered by the cover 230, 2301, 2302 when the rotational speed of the propeller or turbine 10 is below a predetermined threshold, which threshold may be set so as to avoid or reduce the performance degradation associated with a blade 100 with a fixed slot 120 at low air speeds. Similarly, the mechanism may be configured such that a minimum portion of the air passage 220 is covered by the cover 230, 2301, 2302 when the rotational speed of the propeller or turbine 10 is above a predetermined threshold. Furthermore, the mechanism may be configured such that the extent to which the air passage 220 is non-covered may vary gradually with the rotational speed of the propeller or turbine 10.

The air passage 220 may have a variety of different shapes. For example, as shown in FIG. 2, the air passage 220 may comprise an elongate slot arranged substantially in the spanwise direction of the aerofoil module 200. Accordingly, the cover 230, 2301, 2302 may have a variable spanwise extent, and may be configured to cover a variable spanwise length of the air passage 220. As illustrated in FIGS. 1 and 2, the extent of the cover 230 may be varied by the root-side end of the cover 230 moving in the spanwise direction of the aerofoil module 200. The tip-side end of the cover 230 may remain fixed relative to the aerofoil module 200. Alternatively, the root-side end of the cover 230 may remain fixed while the tip-side end of the cover 230 may move in the spanwise direction of the aerofoil module 200.

As shown in FIG. 3, the air passage 220 may be inclined, so that the entrance opening 222 is closer to the leading edge LE than the exit opening 221 is close to the leading edge LE. Furthermore, the chordwise width of the air passage 220 may be converging, i.e. it is wider towards the entrance opening 222 and narrower towards the exit opening 221. Alternatively, the chordwise width of the air passage 220 may be uniform, or may be diverging.

Furthermore, although FIGS. 1 and 2 show an air passage 220 formed as a continuous slot, the air passage 220 may instead be formed discontinuously as several slots distributed spanwise. Furthermore, the aerofoil module 200 may comprise two or more air passages 220, formed at two or more chordwise positions.

Figure 4:
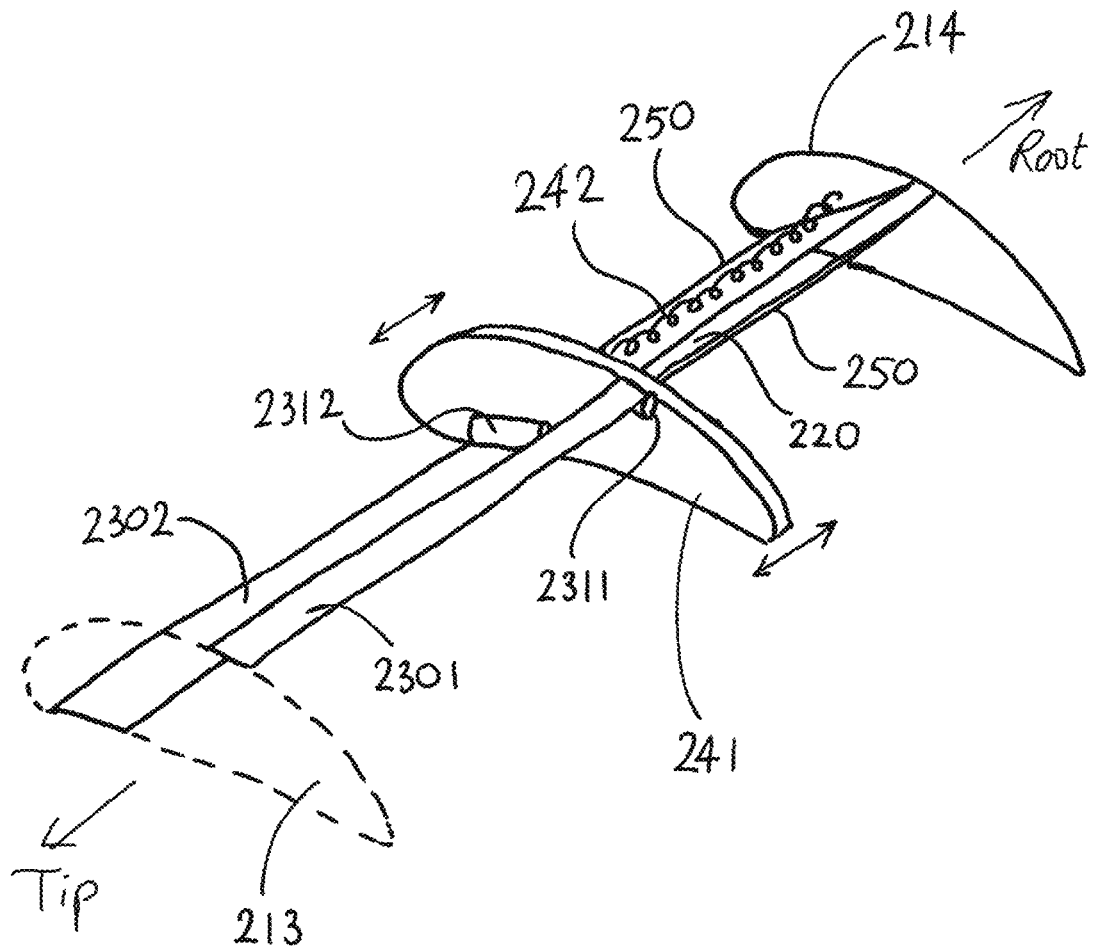
FIG. 4 shows internal components of the aerofoil module of FIG. 2.

FIG. 4 schematically shows internal components of the aerofoil module 200 shown in FIG. 2, with the pressure surface 212 and the suction surface 211 omitted for clarity. As shown, mechanism of the aerofoil 200 may comprise a sliding mass 241 configured to slide in a spanwise direction of the aerofoil module 200. The cover 230, 2301, 2302 may have a tip-side end (towards the blade tip) and a root-side end (towards the blade root). The root-side end may be connected to the sliding mass 241. Therefore, the spanwise extent of the cover 230, 2301, 2302 may be variable by the sliding mass 241 moving the root-side end of the cover 230, 2301, 2302. Therefore, as the rotational speed of the propeller or turbine 10 increases, the amount of centrifugal force acting on the sliding mass 241 may also increase, which may in turn cause the sliding mass 241 to move towards the tip of the blade 100.

As the oncoming air speed decreases, it may be desirable to reduce the extent of the non-covered portion of the air passage 220. As such, as shown in FIG. 4, the aerofoil module 200 may further comprise a biasing member 242, biasing the sliding mass 241 towards the root of the blade 100. For example, as depicted in FIG. 4, the biasing member 242 may be a tension spring. Alternatively or additionally, the biasing member 242 may be an elastomeric member under tension. FIG. 4 shows that the biasing member 242 is provided on the root side of the sliding mass 241, such that it biases the sliding mass 241 towards the root of the blade 100 by exerting a tension force. However, additionally or alternatively, the biasing member 242 may be provided on the tip side of the sliding mass 241, so as to bias the sliding mass 241 towards the root of the blade 100 by exerting a compression force. Whether acting by tension or compression, the biasing member 242 may be coil spring. Alternatively or additionally, the biasing member 242 may comprise an air spring.

Therefore, while the centrifugal force pushes the sliding mass 241 towards the tip side, the biasing member 242 may provide a restoring force biasing the sliding mass 241 towards the root side. In an idealised steady state, in which the rotational speed of the propeller or turbine 10 is constant and the position of the sliding mass 241 within the aerofoil module 200 is also constant, the centrifugal force and the biasing force from the biasing member 242 may be in equilibrium. The equilibrium position of the sliding mass 241 may be a function of the rotational speed of the propeller or turbine 10. That is, when the rotational speed of the propeller or turbine 10 is higher, the centrifugal force acting on the sliding mass 241 may also be higher. The higher centrifugal force may be balanced by an increase in the biasing force from the biasing member 242, which may result from the sliding mass 241 being at a position further towards the tip of the blade 10. In particular, the increase in the biasing force may result from a lengthening of a biasing member 242 under tension, or a shortening of a biasing member 242 under compression. Therefore, for a given rotational speed of the propeller or turbine 10, there may exist an equilibrium position of the sliding mass 241 within the aerofoil module 200 in which the centrifugal force is exactly balanced by the biasing force from the biasing member 242. Furthermore, the equilibrium position may shift towards the tip of the blade 100 as the rotational speed of the propeller or turbine 10 increases. This may in turn increase the length of the non-covered portion of the air passage 220, leading to an increased amount of boundary layer blowing, which may enable the aerofoil module 200 to extract a greater amount of lift from the oncoming air flow.

As shown in FIGS. 2 and 4, the aerofoil module 200 may comprise a tip plate 213 and a root plate 214 which terminate the aerofoil module in the spanwise direction towards the tip side and the root side of the blade 100 respectively. As shown in FIG. 4, the tip-side end of the cover 230, 2301, 2302 may be attached to the tip plate 213. As noted above, the biasing member 242 may be arranged on the root side of the sliding mass 241 and may exert a tension force on the sliding mass 241. In this case, the biasing member 242 may have a root-side end attached to the root plate 214. Alternatively, the root side of the biasing member 242 may extend further towards the root of the blade 100 beyond the root plate 214. This may enable a level of tension force to be maintained on the sliding mass 241 even when the sliding mass 241 is at the furthest position towards the root of the blade 100 (i.e. when the maximum portion of the cross-section of the air passage 220 is covered by the cover 230, 2301, 2302). By maintaining a level of tension force on the sliding mass 241 in this position, the air passage 220 can be prevented from opening until the centrifugal force acting on the sliding mass 241 exceeds a certain predetermined threshold, which threshold may correspond to a specific rotational speed of the propeller or turbine 10. In other words, by maintaining tension, the air passage 220 may remain substantially closed until the rotational speed of the propeller or turbine 10 reaches a certain threshold. In particular, the threshold may be set to correspond to an oncoming air speed below which the aforementioned performance deterioration observed at low oncoming air speeds might occur if the air passage 220 were to remain open.

In addition to serving as fixing points for the cover 230, 2301, 2302 and/or the biasing member 242, the tip plate 213 and/or the root plate 214 may also serve as stoppers for limiting the movement of the sliding mass 241. Furthermore, the tip plate 213 and the root plate 214 may also serve as anchor points for attaching the aerofoil module 200 to the remaining portions of the blade 100.

In reality, several factors may prevent or slow the sliding mass 241 from settling at the equilibrium position within the aerofoil module 200. For example, if the propeller or turbine 10 is horizontally mounted, as in the case of a horizontal-type wind turbine or an aircraft propeller of a cruising aircraft (or, to a lesser extent, a helicopter rotor during forward flight, which may be tilted forward), gravity may act on the sliding mass 241 harmonically at a frequency corresponding to the rotational speed of the propeller or turbine 10. For another example, when a wind-turbine rotor is accelerated sharply by an abrupt gust of wind, the sliding mass 241 may be accelerated sharply towards the tip of the blade 100, and may take a long time to settle at the equilibrium position within the aerofoil module 200.

Therefore, the aerofoil module 200 may further comprise a damper (not shown) configured to dampen the motion of the sliding mass 241. Any suitable type of dampers may be used. For example, a viscous fluid damper, or an air damper may be used. Furthermore, the damper may be integrated with the biasing member 242, similar to automotive suspension.

Alternatively or additionally, the damper may be configured to introduce friction between the sliding mass 241 and an inner wall of the body 210 comprising the suction surface 211 and the pressure surface 212. In particular, the sliding mass 241 may have a shape that fits within but closely follows the profile of the aerofoil module 200. A gap may exist between the periphery of the sliding mass 241 and the inner wall of the body 210. In order to provide friction, a brush may be provided on the periphery of the sliding mass 241, which brush may press against the inner wall of the body 210. Alternatively or additionally, by shaping the sliding mass 241 to follow the inner wall of the body 210, the sliding mass 241 itself may also serve as the damper by forcing air within the body 210 to move between the volume of space on the tip side of the sliding mass 241 and the volume of space on the root side of the sliding mass 241 by flowing through the gap between the periphery of the sliding mass 241 and the inner wall of the body 210. In other words, the sliding mass 241 may function as the piston of a dashpot as the sliding mass 241 moves in the spanwise direction within the aerofoil module 200.

As shown in FIG. 4, the cover 230, 2301, 2302 may comprise a pliable membrane. This may enable the cover 230, 2301, 2302 to have a deployed portion which corresponds to the extent of the cover, and a non-deployed portion which is folded or rolled up. Alternatively or additionally, in order to maintain tension, the membrane may be made of an elastomer.

Figure 5:
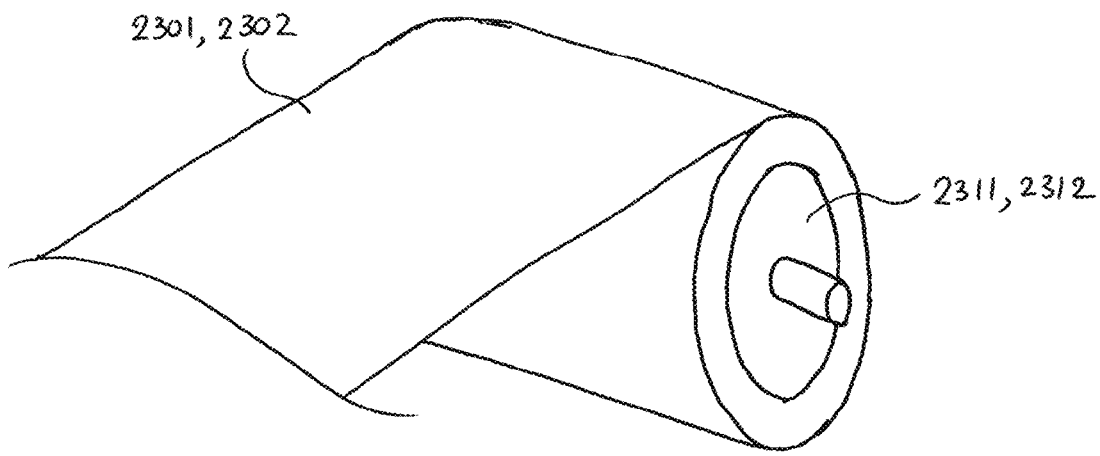
FIG. 5 shows a spool used in the aerofoil module of FIG. 2.
Figure 6:
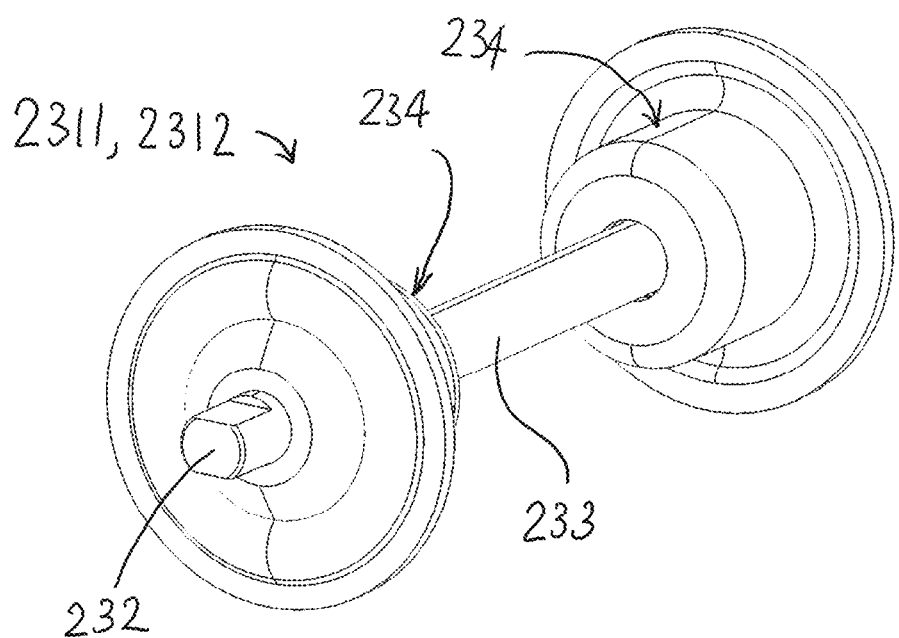
FIG. 6 shows a spool used in the aerofoil module of FIG. 2.

As shown in FIG. 4, the aerofoil module 200 may further comprise a spool 2311, 2312. As shown in FIG. 5, the spool 2311, 2312 may enable the spanwise extent of the cover 230, 2301, 2302 to be variable by winding a variable length of the cover 230, 2301, 2302 onto the spool 2311, 2312. That is, the non-deployed portion of the cover 230, 2301, 2302 may be wound onto the spool 2311, 2312. Furthermore, the spool 2311, 2312 may be biased to maintain the cover 230, 2301, 2302 under tension. In particular, the deployed portion of the cover 2301, 2302 may be maintained under tension by the biasing of the spool 2311, 2312. For example, the spool 2311, 2312 may be rotationally biased. For example, as shown in FIG. 6, the spool 2311, 2312 may comprise a spindle 232, a cylindrical surface 233, and a torsion spring 234 (e.g. a spiral torsion spring). The spindle 232 may be fixed and the cylindrical surface 233 may be allowed to rotate on the spindle 232 and be biased by the torsion spring 234 in the rotational direction required to maintain tension on the cover 230, 2301, 2302. The spindle 2302 may be rigidly attached to the sliding mass 241, and the spool 2311, 2312 may thus be rotatably fixed to the sliding mass 241. The biasing of the spool 2311, 2312 may maintain the cover 230, 2301, 2302 under tension as the spanwise extent of the cover changes. By maintaining the cover 230, 2301, 2302 under tension, the cover 230, 2301, 2302 may be less likely to flutter or vibrate due to aerodynamic forces.

The cover 230 may be configured to cover a variable portion of one or both of the entrance opening 222 and the exit opening 221. As shown in FIG. 3, cover 2302 may cover a variable portion of the entrance opening 222. The cover 2301 may cover a variable portion of the exit opening 221. In particular, in arrangements where the cover 230, 2301, 2302 is configured to cover a variable portion of the entrance opening 222 and/or the exit opening 221, the cover 230, 2301, 2302 may be arranged to partially overlap and be in contact with the inner wall of the body 210. In this arrangement, the cover 2301, 2302 may form part of the pressure surface 212 and/or the suction surface 211, and may thus have an aerodynamic effect on the airflow on the pressure/suction surfaces. Therefore, the cover 2301, 2302 may be configured to wrinkle-free when deployed. For example, the cover 2301, 2302 may be made of an elastomer membrane, which may be maintained under tension by the spool 2311, 2312, so as to maintain a smooth, wrinkle-free surface.

Additionally or alternatively, the cover 230 may be provided in a medial position within the air passage 220 (not shown in the figures).

In addition to the cover 230, 2301, 2302, as shown in FIG. 4, the aerofoil module 200 may further comprise retractable walls 250 defining the portion of the air passage 220 which is not covered by the cover 230, 2301, 2302. As shown in FIG. 4, two retractable walls 250, one towards the leading edge LE, the other towards the trailing edge TE, may be provided. The two retractable walls 250, together with the sliding mass 241 and the root plate 214 may form the non-covered portion of the air passage 220 through which air flow from the pressure side 212 may be directed to the suction side 211. In FIG. 3, the shape of the air passage 220 formed by the retractable walls 250 is illustrated in dotted lines. The retractable walls 250 may have a root-side end and tip-side end. The tip-side end of each of the retractable walls may be attached to the sliding mass 241. The root-side end of each of the retractable walls may be attached to the root plate 214. Therefore, as the sliding mass 241 moves in the spanwise direction within the aerofoil module 200, the tip-side end of the retractable walls 250 may move together with the sliding mass 241, thereby changing the length of the non-covered portion of the air passage 220.

The retractable walls 250 may be constructed in a variety of ways. For example, the retractable walls 250 may be constructed of elastomer membranes. Additionally or alternatively, the retractable walls 250 may comprise shutters which overlap to a varying degree depending on the spanwise length of the non-covered portion of the air passage 220. In particular, an elastomer membrane and a set of shutters may be combined to form each of the retractable walls 250. For example, the shutters may be attached to the elastomer membrane and be evenly distributed along the spanwise length of the elastomer membrane. With this arrangement, as the retractable walls 250 change in spanwise length, the extent to which the shutters overlap may vary smoothly and proportionally to the spanwise length of the retractable walls 250. Furthermore, the shutters may be made of rigid panels, which may provide structural integrity to the retractable walls 250, and may prevent undesired inflow turbulence. The elastomer membranes may inwardly face the air passage 220, so as to provide smooth, wrinkle-free aerodynamic surfaces to the air flow within the air passage 220.

Figure 7:
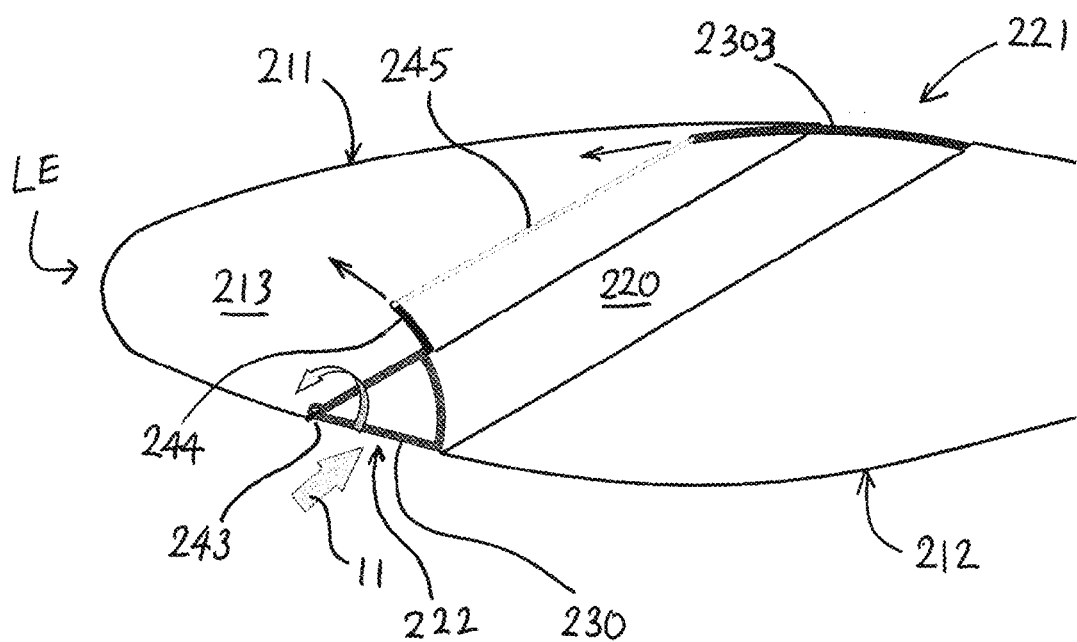
FIG. 7 shows an aerofoil module in accordance with an embodiment of the invention.

As noted above, the mechanism of the aerofoil module 200 may generally react passively to centrifugal force. As an alternative, as shown in FIG. 7, the mechanism may instead react passively to a thrust 11 from the oncoming air acting on the pressure surface 212. The mechanism may react passively to the thrust 11 such that the cover 230 covers a smaller portion of the cross-section of the air passage 220 in response to a higher thrust, and covers a larger portion of the cross-section of the air passage 220 in response to a lower thrust. In particular, the cover 230 may be configured to cover a variable portion of the entrance opening 222. In this case, the cover 230 may form part of the mechanism. Specifically, the cover 230 may form part of the mechanism which is responsible for reacting passively to the thrust 11. This arrangement may be particularly suited to propellers or turbines that operate at a fixed rotational speed, particularly fixed-speed wind turbines. In particular, some small-scale horizontal axis wind turbines operate at a fixed rotational speed to facilitate direct connection to a power grid.

More specifically, as shown in FIG. 7, the cover 230 may be rotatable between a closed position in which the cover 230 blocks air from entering the air passage 220, and an open position in which the cover 230 allows air to enter the air passage 220. As shown, the cover 230 may be rotatably fixed to the aerofoil module 200 by a hinge 243. The hinge 243 may be provided at or near an edge of the entrance opening 222 which is closer to the leading edge LE of the aerofoil module 200. Therefore, in the orientation of the aerofoil 200 shown in FIG. 7, the cover 230 may rotate from the closed position to the open position in a counter-clockwise direction. As a result, as the amount of thrust 11 from the oncoming air increases, the thrust 11 may push the cover 230 towards the open position, and airflow from the pressure surface 212 may enter into the air passage 220 and reach the suction surface 211. Furthermore, the cover 230 may be in a number of intermediate positions between the closed position and the open position as a function of the amount of thrust 11. That is, the position of the cover 230 may vary gradually with the amount of thrust 11.

The cover 230 may be biased by a biasing member (not shown in FIG. 7) towards the closed position. Therefore, for a given amount of thrust 11, there may exist an equilibrium position of the cover 230 at which the biasing force from the biasing member substantially counteracts the thrust 11. The air pressure in the internal space 213 of the aerofoil module 200 may be treated as approximately atmospheric (which can vary with altitude in the case of an aircraft propeller, for example). Compared with the magnitude of the thrust 11 and the biasing force from the biasing member, the pressure of the internal space 213 acting on the cover 230 may have a negligible effect.

Furthermore, a damper (not shown) may also be provided to dampen the motion of the cover 230 shown in FIG. 7. The provision of a damper may enable the cover 230 to settle at the equilibrium position more quickly. This may result in the overall aerodynamic stability of the aerofoil module 200.

In addition to the cover 230, a second cover 2303 may be provided. As shown in FIG. 7, the second cover 2303 may be configured to cover a variable portion of the exit opening 221. In particular, the second cover 2303 may approximate the contour of the suction surface 211, so as to maintain a smooth aerodynamic surface on the suction surface 211 when the second cover 2303 fully covers the air passage 220. As shown in FIG. 7, the second cover 2303 may slide to uncover a variable portion of the exit opening 221.

Furthermore, the second cover 2303 may be mechanically linked and actuated by the first cover 230. Specifically, the second cover 2303 may cover a larger portion of the exit opening 221 when the first cover 230 covers a larger portion of the entrance opening 222, and the second cover 2303 may cover a smaller portion of the exit opening 221 when the first cover 230 covers a smaller portion of the entrance opening 222. That is, the first cover 230 and the second cover 2303 may move in unison to cover and uncover the air passage 220.

FIG. 7 shows an example of the mechanical linkage between the first cover 230 and the second cover 2303. As shown, a first linkage 244 is rigidly attached to the first cover 230. A second linkage 245 has one end hinged to the first linkage 244 and another end hinged to the second cover 2303. As the first cover 230 rotates in the counter-clockwise direction as shown in FIG. 7, the hinge between the first linkage 244 and the second linkage 245 moves generally towards the leading ledge LE. This in turn causes the second linkage 245 to pull the second cover 2303 also towards the leading edge LE, thereby gradually uncovering the exit opening 221.

Further Aspects of the Invention

In addition to the aerofoil module 200, an aspect of the present invention is directed to a propeller or turbine blade 100 comprising the aerofoil module 200. As mentioned above, the aerofoil module 200 may be a spanwise section of the blade 100.

Although FIG. 1 shows that the aerofoil module 200 is provided at a medial spanwise position between the root and the tip of the blade 100, the aerofoil module 200 may begin at or close to the root of the blade 100, and/or may terminate at or close to the tip of the blade 100. Alternatively, the aerofoil module 200 may span the full span of the blade 100. Any of the variants of the aerofoil module 200 disclosed above may be incorporated into the blade 100.

Figure 8:
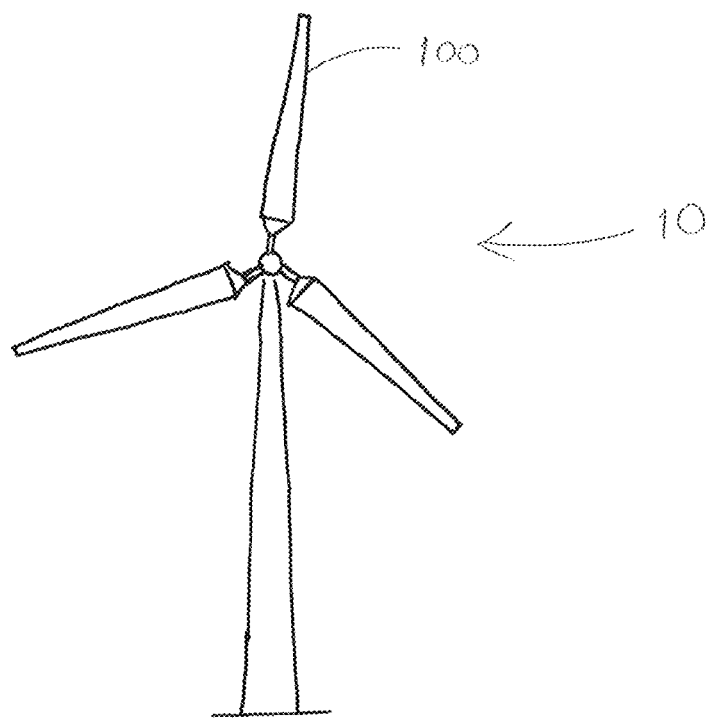
FIG. 8 shows a wind turbine rotor.

A further aspect of the present invention is directed to a rotor 10, which may be a propeller or a turbine. FIG. 8 shows a wind turbine rotor 10, which may comprise a plurality of wind turbine blades 100, each of which may comprise an aerofoil module 200 such as those described previously. Other rotors, such as aircraft propellers or helicopter rotors, may also have blades into which an aerofoil module 200 such as those described previously is incorporated. Any of the variants of the aerofoil module 200 disclosed above may be incorporated into the blades of the rotor 10.

The construction and arrangement of the apparatuses as shown in the various exemplary embodiments are illustrative only. Although only a few embodiments have been described in detail in this disclosure, many modifications are possible (e.g. variations in sizes, dimensions, structures, shapes and proportions of the various elements, values of parameters, mounting arrangements, use of materials, orientations, etc.). By way of example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Preferred Embodiments

The clauses below define preferred combinations of features. The applicant reserves the right to pursue protection for the combinations of features set out in these clauses, and/or for any other subject-matter contained in the application as filed, either in the present application or in a further application divided from the present application.

These clauses are not claims of the present application. The claims of the present application are set out under a separate section headed "claims".

Clause 1. An aerofoil module (200) for use in a blade (100) of a propeller or turbine (10), the aerofoil module comprising:
 a body (210) comprising a suction surface (211) and a pressure surface (212);
 an air passage (220) traversing the body, wherein the air passage has an entrance opening (222) on the pressure surface and an exit opening (221) on the suction surface;
 a cover (230) configured to cover a variable portion of the cross-section of the air passage; and
 a mechanism configured to vary the portion of the cross-section of the air passage covered by the cover, wherein the mechanism is configured to react passively to the oncoming air speed of oncoming air in the axial direction of the propeller or turbine;
 wherein the mechanism is configured to vary the portion of the cross-section of the air passage covered by the cover such that the cover covers a smaller portion of the cross-section of the air passage in response to a higher oncoming air speed, and covers a larger portion of the cross-section of the air passage in response to a lower oncoming air speed.

Clause 2. The aerofoil module of clause 1, wherein the mechanism is configured to react passively to the centrifugal force induced by the rotation of the propeller or turbine, such that the cover covers a smaller portion of the cross-section of the air passage in response to a higher rotational speed of the propeller or turbine, and to cover a larger portion of the cross-section of the air passage in response to a lower rotational speed of the propeller or turbine.

Clause 3. The aerofoil module of clause 1 or clause 2, wherein the air passage comprises an elongate slot arranged substantially in the spanwise direction of the aerofoil module.

Clause 4. The aerofoil module of any one of clauses 1 to 3, wherein the cover has a variable spanwise extent and is configured to cover a variable spanwise length of the air passage.

Clause 5. The aerofoil module of any one of clauses 1 to 4, wherein the mechanism comprises a sliding mass (241) configured to slide in a spanwise direction of the aerofoil module, wherein the cover has a tip-side end and a root-side end, the root-side end is connected to the sliding mass, and the spanwise extent of the cover is variable by the sliding mass moving the root-side end of the cover.

Clause 6. The aerofoil module of clause 5, further comprising a biasing member (242) biasing the sliding mass towards the root of the blade.

Clause 7. The aerofoil module of clause 5 or clause 6, further comprising a damper configured to dampen the motion of the sliding mass.

Clause 8. The aerofoil module of any one of clauses 1 to 7, wherein the cover comprises a pliable membrane.

Clause 9. The aerofoil module of any one of clauses 1 to 8, further comprising a spool (2311, 2312), wherein the spanwise extent of the cover is variable by winding a variable length of the cover onto the spool.

Clause 10. The aerofoil module of clause 9, wherein the spool is biased to maintain the cover under tension.

Clause 11. The aerofoil module of clause 9 or clause 10, further comprising a sliding mass configured to slide in a spanwise direction of the aerofoil module, wherein the cover has a tip-side end and a root-side end, and the spool is rotatably fixed to the sliding mass.

Clause 12. The aerofoil module of any one of clauses 1 to 11, wherein the cover is configured to cover a variable portion of one of the entrance opening and the exit opening.

Clause 13. The aerofoil module of any one of clauses 1 to 11, comprising first and second said covers, wherein the first cover (2302) is configured to cover a variable portion of the entrance opening, and the second cover (2301) is configured to cover a variable portion of the exit opening.

Clause 14. The aerofoil module of any one of clauses 1 to 13, further comprising retractable walls (250) defining a portion of the air passage which is not covered by the cover.

Clause 15. The aerofoil module of clause 14, further comprising a sliding mass configured to slide in a spanwise direction of the aerofoil module, wherein the retractable walls have a root-side end and a tip-side end, and the tip-side end of each of the retractable walls is attached to sliding mass.

Clause 16. The aerofoil module of any one of clauses 1 to 15, wherein the mechanism is configured to react passively to a thrust (11) from the oncoming air acting on the pressure surface, such that the cover covers a smaller portion of the cross-section of the air passage in response to a higher thrust, and covers a larger portion of the cross-section of the air passage in response to a lower thrust.

Clause 17. The aerofoil module of clause 16, wherein the cover is configured to cover a variable portion of the entrance opening.

Clause 18. The aerofoil module of clause 16 or clause 17, wherein the cover is rotatable between a closed position in which the cover blocks air from entering the air passage, and an open position in which the cover allows air to enter the air passage.

Clause 19. The aerofoil module of clause 18, further comprising a biasing member biasing the cover towards the closed position.

Clause 20. The aerofoil module of any one of clauses 16 to 19, further comprising a second cover (2303) configured to cover a variable portion of the exit opening.

Clause 21. The aerofoil module of clause 20, wherein the second cover is mechanically linked to and actuated by the first cover, such that the second cover covers a larger portion of the exit opening when the first cover covers a larger portion of the entrance opening, and the second cover covers a smaller portion of the exit opening when the first cover covers a smaller portion of the entrance opening.

Clause 22. A propeller or turbine blade (100) comprising:
 a body (210) comprising a suction surface (211) and a pressure surface (212);
 an air passage (220) traversing the body, wherein the air passage has an entrance opening (222) on the pressure surface and an exit opening (221) on the suction surface;
 a cover (230) configured to cover a variable portion of the cross-section of the air passage; and
 a mechanism configured to vary the portion of the cross-section of the air passage covered by the cover, wherein the mechanism is configured to react passively to the oncoming air speed of oncoming air in the axial direction of the propeller or turbine;
 wherein the mechanism is configured to vary the portion of the cross-section of the air passage covered by the cover such that the cover covers a smaller portion of the cross-section of the air passage in response to a higher oncoming air speed, and covers a larger portion of the cross-section of the air passage in response to a lower oncoming air speed.

Clause 23. A propeller or turbine (10) comprising a plurality of blades (100), each of the blades comprising:
 a body (210) comprising a suction surface (211) and a pressure surface (212);
 an air passage (220) traversing the body, wherein the air passage has an entrance opening (222) on the pressure surface and an exit opening (221) on the suction surface;
 a cover (230) configured to cover a variable portion of the cross-section of the air passage; and
 a mechanism configured to vary the portion of the cross-section of the air passage covered by the cover, wherein the mechanism is configured to react passively to the oncoming air speed of oncoming air in the axial direction of the propeller or turbine;
 wherein the mechanism is configured to vary the portion of the cross-section of the air passage covered by the cover such that the cover covers a smaller portion of the cross-section of the air passage in response to a higher oncoming air speed, and covers a larger portion of the cross-section of the air passage in response to a lower oncoming air speed.

The invention claimed is:
1. An aerofoil module for use in a blade of a propeller or turbine, the aerofoil module comprising:
 a body comprising a suction surface and a pressure surface;
 an air passage traversing the body, wherein the air passage comprises an elongate slot arranged substantially in a spanwise direction of the aerofoil module, and wherein the air passage has an entrance opening on the pressure surface and an exit opening on the suction surface;
 a cover configured to cover a variable portion of the cross-section of the air passage, wherein the cover has a variable spanwise extent and is configured to cover a variable spanwise length of the air passage; and
 a mechanism configured to vary the portion of the cross-section of the air passage covered by the cover, wherein the mechanism is configured to react passively to the oncoming air speed of oncoming air in the axial direction of the propeller or turbine;
 wherein the mechanism is configured to vary the portion of the cross-section of the air passage covered by the cover such that the cover covers a smaller portion of the cross-section of the air passage in response to a higher oncoming air speed, and covers a larger portion of the cross-section of the air passage in response to a lower oncoming air speed; and
 wherein the mechanism is configured to react passively to the centrifugal force induced by the rotation of the propeller or turbine, such that the cover covers a smaller portion of the cross-section of the air passage in response to a higher rotational speed of the propeller or turbine, and to cover a larger portion of the cross-section of the air passage in response to a lower rotational speed of the propeller or turbine; and
  wherein the mechanism comprises a sliding mass configured to slide in the spanwise direction of the aerofoil module, wherein the cover has a tip-side end and a root-side end, the root-side end is connected to the sliding mass, and the spanwise extent of the cover is variable by the sliding mass moving the root-side end of the cover.

2. The aerofoil module of claim 1, further comprising a biasing member biasing the sliding mass towards the root of the blade.

3. The aerofoil module of claim 1, further comprising a damper configured to dampen the motion of the sliding mass.

4. The aerofoil module of claim 1, further comprising a spool, wherein the spanwise extent of the cover is variable by winding a variable length of the cover onto the spool.

5. The aerofoil module of claim 4, further comprising a sliding mass configured to slide in a spanwise direction of the aerofoil module, wherein the cover has a tip-side end and a root-side end, and the spool is rotatably fixed to the sliding mass.

6. The aerofoil module of claim 1, comprising first and second said covers, wherein the first cover is configured to cover a variable portion of the entrance opening, and the second cover is configured to cover a variable portion of the exit opening.

7. The aerofoil module of claim 1, further comprising retractable walls defining a portion of the air passage which is not covered by the cover.

8. The aerofoil module of claim 7, further comprising a sliding mass configured to slide in a spanwise direction of the aerofoil module, wherein the retractable walls have a root-side end and a tip-side end, and the tip-side end of each of the retractable walls is attached to sliding mass.

9. An aerofoil module for use in a blade of a propeller or turbine, the aerofoil module comprising:
   a body comprising a suction surface and a pressure surface;
   an air passage traversing the body, wherein the air passage has an entrance opening on the pressure surface and an exit opening on the suction surface;
   a cover configured to cover a variable portion of the cross-section of the air passage; and
   a mechanism configured to vary the portion of the cross-section of the air passage covered by the cover, wherein the mechanism is configured to react passively to the oncoming air speed of oncoming air in the axial direction of the propeller or turbine;
   wherein the mechanism is configured to vary the portion of the cross-section of the air passage covered by the cover such that the cover covers a smaller portion of the cross-section of the air passage in response to a higher oncoming air speed, and covers a larger portion of the cross-section of the air passage in response to a lower oncoming air speed; and
   wherein the mechanism is configured to react passively to a thrust from the oncoming air acting on the pressure surface, such that the cover covers a smaller portion of the cross-section of the air passage in response to a higher thrust, and covers a larger portion of the cross-section of the air passage in response to a lower thrust.

10. The aerofoil module of claim 9, wherein the cover is configured to cover a variable portion of the entrance opening.

11. The aerofoil module of claim 10, wherein the cover is rotatable between a closed position in which the cover blocks air from entering the air passage, and an open position in which the cover allows air to enter the air passage.

12. The aerofoil module of claim 11, further comprising a biasing member biasing the cover towards the closed position.

13. The aerofoil module of claim 10, further comprising a second cover configured to cover a variable portion of the exit opening.

14. The aerofoil module of claim 13, wherein the second cover is mechanically linked to and actuated by the first cover, such that the second cover covers a larger portion of the exit opening when the first cover covers a larger portion of the entrance opening, and the second cover covers a smaller portion of the exit opening when the first cover covers a smaller portion of the entrance opening.

15. A propeller or turbine blade comprising:
   a body comprising a suction surface and a pressure surface;
      an air passage traversing the body, wherein the air passage comprises an elongate slot arranged substantially in a spanwise direction of the aerofoil module, and wherein the air passage has an entrance opening on the pressure surface and an exit opening on the suction surface;
      a cover configured to cover a variable portion of the cross-section of the air passage, wherein the cover has a variable spanwise extent and is configured to cover a variable spanwise length of the air passage; and
      a mechanism configured to vary the portion of the cross-section of the air passage covered by the cover, wherein the mechanism is configured to react passively to the oncoming air speed of oncoming air in the axial direction of the propeller or turbine;
   wherein the mechanism is configured to vary the portion of the cross-section of the air passage covered by the cover such that the cover covers a smaller portion of the cross-section of the air passage in response to a higher oncoming air speed, and covers a larger portion of the cross-section of the air passage in response to a lower oncoming air speed;
   wherein the mechanism is configured to react passively to the centrifugal force induced by the rotation of the propeller or turbine, such that the cover covers a smaller portion of the cross-section of the air passage in response to a higher rotational speed of the propeller or turbine, and to cover a larger portion of the cross-section of the air passage in response to a lower rotational speed of the propeller or turbine; and
   wherein the mechanism comprises a sliding mass configured to slide in the spanwise direction of the aerofoil module, wherein the cover has a tip-side end and a root-side end, the root-side end is connected to the sliding mass, and the spanwise extent of the cover is variable by the sliding mass moving the root-side end of the cover.

16. A propeller or turbine comprising a plurality of blades, wherein each of the blades comprises the aerofoil module of claim 1.

* * * * *